Aug. 12, 1969  R. E. CASKO  3,460,928

METHOD OF MAKING LENS MOLDS

Filed June 9, 1967  5 Sheets-Sheet 1

INVENTOR.
ROBERT E. CASKO

BY  J. Albert Hultquist
ATTORNEY

Aug. 12, 1969     R. E. CASKO     3,460,928
METHOD OF MAKING LENS MOLDS
Filed June 9, 1967     5 Sheets-Sheet 3

INVENTOR.
ROBERT E. CASKO
BY J. Albert Wullywort
ATTORNEY

United States Patent Office 3,460,928
Patented Aug. 12, 1969

3,460,928
METHOD OF MAKING LENS MOLDS
Robert E. Casko, Putnam, Conn., assignor to American Optical Corporation, a corporation of Delaware
Filed June 9, 1967, Ser. No. 644,885
Int. Cl. C03b 23/22
U.S. Cl. 65—39     10 Claims

ABSTRACT OF THE DISCLOSURE

A method of making glass mold pieces for casting plastic multifocal ophthalmic lenses involving the use of a flat reference surface on each mold piece in a planned sequence of blocking steps for establishing a desired lateral offset relationship of a number of adjoining spherical casting areas required to be sequentially generated into the mold piece.

BACKGROUND OF THE INVENTION

Field of the invention

Making glass molds for casting plastic ophthalmic lenses more particularly of the multifocal type.

Description of prior art

Plastic lenses are currently being cast between a pair of spaced glass mold pieces, at least one of which has a side shaped to conform exactly to the configuration desired of a finished surface of the cast lens. While the other mold piece may be of precisely the curvature or configuration corresponding to that desired of an opposite side of the lens to be cast and the spacing between mold pieces precisely controlled for achieving, in one casting operation, a plastic lens finished on both sides, this is not the usual procedure in multifocal ophthalmic lens work.

Plastic multifocal ophthalmic lenses are more commonly and generally preferably cast with only one finished surface. The final prescriptive requirements of the lens are completed after casting by grinding and polishing its opposite surface, called its second side, to a predetermined depth and character of curvature.

The side of the multifocal lens which is finished by casting (usually its convex side) is provided with individual focal fields each of a shape, size, surface curvature and preselected location on the lens determined according to specifications set for the particular type of lens desired.

As it is well known in the ophthalmic lens art, multifocal lenses have distance, reading and often intermediate focal fields of various sizes and configurations, the latter two of which are displaced or offset from the geometrical center of the lens while the former (the distance field) is not. In some cases the distance field surrounds the reading and intermediate fields but in others it merely adjoins these fields.

Since it is necessary to have certain of the focal fields of a cast lens offset from the center of the lens, the same holds true for the focal field casting areas of the mold piece used to form the finished multifocal lens surface.

Heretofore such mold pieces were formed of meniscus glass blanks wherein the actual offset location of various differently curved casting areas and their centers of different radii of curvature were located by tilting or angling the glass blanks relative to an imaginary line along which the centers of curvature of the various casting areas of the blanks were desired to be positioned. Thus, there was introduced the well-recognized extremely difficult problem of achieving precise amounts of lateral displacement of the focal field casting areas by measuring angulation of the blanks rather than actual distances of lineal displacement of these areas. In other words, small amounts (i.e. minutes or even seconds) of error in angular measurement, which invariably occur to some degree, produce relatively large errors of linear displacement, particularly in the longer radii of surface curvatures which are used to produce some of the offset casting areas of the mold blanks. Added to this, the inherent variation in curvature and thicknesses of molded meniscus blanks require that individual attention be given thereto in determining what the aforesaid angular settings should actually be.

In general, prior art techniques of forming multifocal mold pieces are not well adapted to systematism or reliable duplication. The skill and judgment of the mold maker is greatly depended upon not only in initially setting the mold blank for generation of each of its focal field casting areas but also in taking proper and timely corrective actions during the generating (grinding) operations to bring the casting areas to proper depth, shape, size and positional relationship with each other.

Multifocal mold pieces particularly of the trifocal and other types having acute cliff-like lines of division between one or more of their focal field casting areas, are delicate in that such dividing lines are easily chipped or otherwise damaged during handling. For this reason, if not for the most common reason of general surface scratching, the mold pieces must be frequently replaced. Thus, there is an urgent need in the field of this invention for a reliable systematic method of making multifocal mold pieces so that greater precision, speed and economy of their manufacture can be realized without reliance upon the skill of the mold maker. This is a principal aim of the present invention and it is attained as follows:

SUMMARY OF THE INVENTION

The basic prerequisite for the present process is a cylindrical glass mold blank made special by having one of its sides ground or otherwise formed to a flat surface and provided with a radial groove prior to processing of its opposite side upon which a multifocal lens casting surface is to be formed.

In forming the multifocal casting surface, the grooved flat side of the glass blank is used as a reference surface. The axis of the blank is located coaxially and at various preselected laterally offset relationships with the axis of rotation of a holder provided therefor which will be referred to hereinafter as a "block." The block, having an annular blank receiving seat, receives the flat reference surface of the glass blank in such manner that the glass blank and block are, at all times, axially parallel with each other whether concentric or not. Also provided in the block is an upstanding key member adapted to engage the aforesaid groove and facilitate the establishment of a given alignment of rotational orientation of the blank on the block.

A removable blocking medium adapted to be introduced into the block beneath the glass blank adherently holds the blank fixedly upon the block during each of various stages of the process of forming (grinding and/or polishing) the aforesaid multifocal casting surface.

Offset and concentric blocking, grinding, polishing and fusing operations are employed in a planned sequence to produce in the glass blank a cavity contour of the specifications required for forming a multifocal casting surface of given design complementary to that desired of a cast multifocal lens surface to be formed thereon.

In offset blocking, the axis of the mold blank and the axis of the block are laterally displaced one relative to the other a calculated amount in the common plane of the flat reference surface and block seat and along a line parallel to length of the groove in the blank so that the axis of the block passes through the center of curvature of a particular spherical casting area to be ground in the blank.

All focal field casting areas of the mold blanks are formed spherical whether concentric with the blank axis or offset therefrom.

At pertinent stages of forming the multifocal casting surface, glass filler pieces are fused thereto and blended into the cavity contour by grinding and polishing to form certain, usually intermediate, focal field casting areas and/or cliff-like lines of division between the casting areas of the surface.

At no stage of the present process is the blank ever tilted or angled relative to the axis of the block about which it is rotated during grinding thereof. It will become apparent hereinafter that the centers and physical location of various casting surface curvatures are established by lateral, not angular, displacement of the blank. The amount of offset is measured directly, i.e., linearly parallel to the reference surface of the blank, not indirectly through angulation as has been the practice heretofore.

Details of the present process will be more fully understood by reference to the following description and accompanying drawing.

DESCRIPTION OF THE PREFERRED EMBODIMENTS

Figures 1, 2, 3, 4, 5, 6:
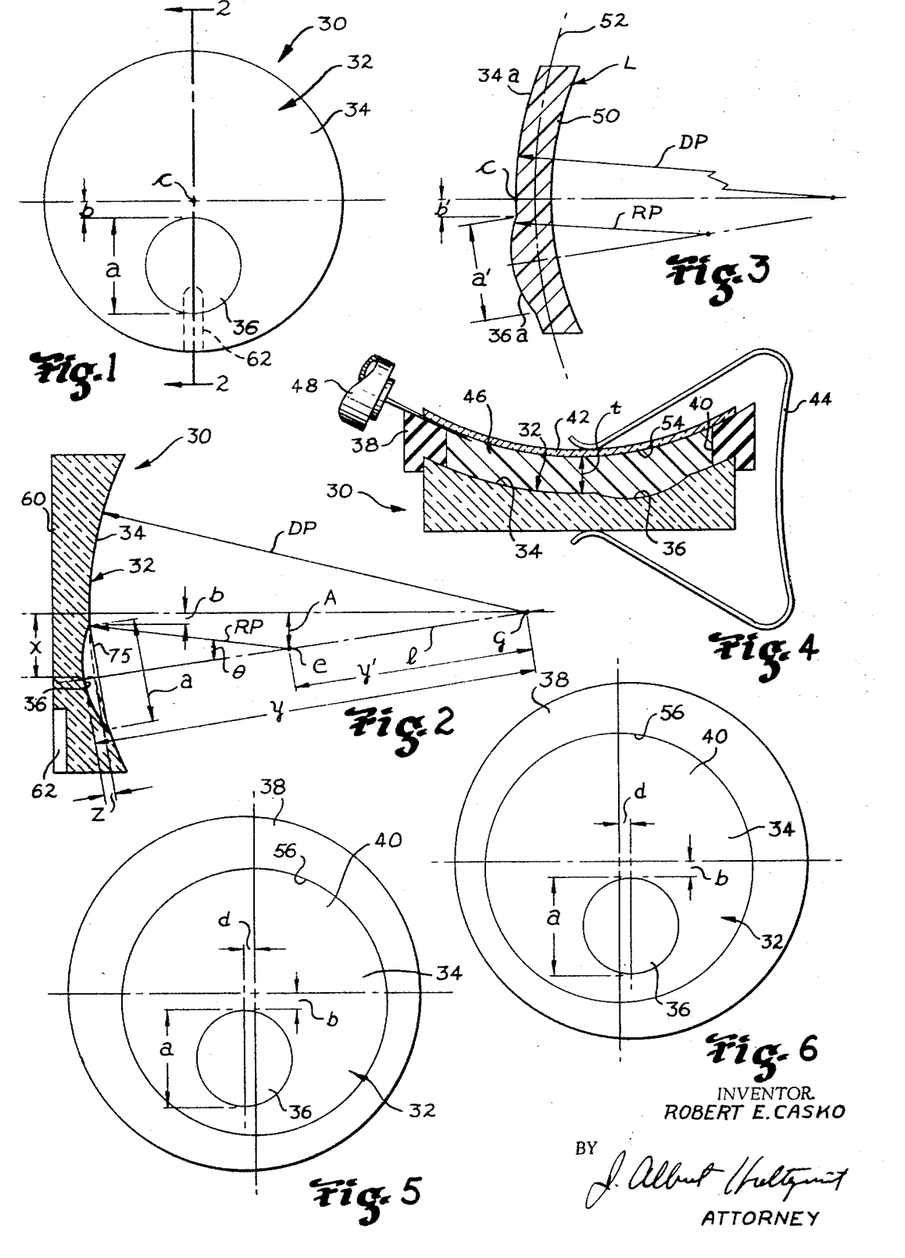
FIG. 1 illustrates, in plan view, a mold piece formed according to principles of this invention.
FIG. 2 is a cross-section taken on line 2—2 of FIG. 1.
FIG. 3 illustrates in cross-section a cast plastic lens.
FIGS. 4, 5 and 6 are illustrations of exemplary equipment which may be used in conjunction with the aforementioned mold piece and other similar embodiments of this invention to cast plastic lenses.

In FIGS. 1 and 2 of the drawing there is illustrated cylindrical mold piece 30 of glass having on one side thereof what is one of the least complex forms of casting surface 32 used in the art of molding plastic multifocal ophthalmic lenses. This mold piece is formed according to principles of the present invention which will be set forth in detail hereinafter and comprises a major casting area 34 and an off-center minor casting area 36. Area 34 is formed to the curvature desired of the distance viewing portion 34a of a bifocal lens L (FIG. 3) to be cast thereupon and area 36 is formed to the spherical curvature desired of the near viewing or reading portion 36a of lens L. The centers of curvature of areas 34 and 36 lie on a line passing through the center of area 36.

Typical of a system for casting a plastic lens L with mold piece 30 and/or with any one of other mold pieces which will be dealt with hereinafter is the arrangement shown in FIG. 4. This comprises an annular gasket 38 of rubber or an equivalent material fitted peripherally about casting surface 32 of mold piece 30. Gasket 38 forms mold cavity 40 having surface 32 as its bottom. Cavity 40 is closed by glass piece 42 which is preferably, but not necessarily, meniscus in shape. Spring clamp 44 holds the aforesaid assembly together and a desired optical casting medium 46 such as, for example, unpolymerized methyl methacrylate or methyl diethylene glycol diallyl carbonate is injected into cavity 40. A hypodermic syringe 48 may, for example, be used to effect the injection.

Once cavity 40 is filled, casting medium 46 is cured in situ and removed as lens L (FIG. 3) by dismantling the arrangement of clamp 44, glass piece 42 and gasket 38.

Lens L (FIG. 3) is ultimately finished by grinding and polishing side 50 thereof to a desired depth and back surface curvature illustrated by dot-dash line 52. As already mentioned, a lens such as lens L also may be cast directly to its finished center thickness and back surface curvature 52 by regulating its center thickness $t$ (FIG. 4) through selection of the thickness of gasket 38 and the provision of an optically finished surface 54 on glass piece 42 having the back curvature 52 desired of the finished lens.

The present disclosure, in dealing more particularly with the manufacture of multifocal casting surfaces on major mold pieces such as mold piece 30 in FIGS. 1, 2 and 4, will not delve into details of all procedures and variations thereof which may be used in casting lenses with the present mold pieces. However, in casting multifocal lenses such as lens L it should be noted that the vertical offset relationship of the geometrical center of one focal field 36a relative to the geometrical center other field 34a is built into the mold piece as can be seen from FIGS. 1 and 2. Area 36 of diameter $a$ is located a prescribed distance $b$ below center $c$ of area 34; center $c$ being the geometrical center of mold piece 30.

For left and right eye use of lenses such as lens L in FIG. 3 it is required that the usual lateral decentration in a prescribed amount be provided for. Thus, using mold piece 30 as an example, left and right decentration may be effected during casting in the manner illustrated in FIGS. 5 and 6, respectively. This simply involves the use of a gasket such as 38 in FIG. 4 having an eccentric opening 56 which forms the aforementioned cavity 40. By orienting gasket 38 on mold piece 30 in the manner illustrated in FIG. 5, reading portion 36a of lens L will become laterally offset for left eye use a distance $d$ equal to the extent of eccentricity of opening 56. Right eye lateral decentration (FIG. 6) may be accomplished simply by revolving the gasket 180° from the FIG. 5 position.

The method of making mold piece 30 of FIGS. 1 and 2 according to principles of this invention is diagrammatically illustrated in FIGS. 7–10. There, as well as in all subsequent views of the drawings, the radii of curvatures and amount of lateral offset relationship of their centers are, for clarity of illustration, greatly exaggerated and are not to be taken as being accurately dimensionally representative of values most commonly used in practice of the invention. However, from time-to-time throughout the following description of different embodiments of the invention, values of typical surface curvature radii and amounts of the lateral offset relationships of their centers will be set forth to clearly enable an artisan to effect actual practice of the invention.

Referring now to FIGS. 7, 8, 9 and 10 it will be seen that mold piece 30 is formed of cylindrical glass blank 30' having axis 58. Blank 30' is either molded or it may be trepanned from flat glass stock. It is provided with a perfectly flat surface 60 having radial groove 62 therein extending along a line which intersects central axis 58. Surface 60 and/or groove 62 may be formed either during molding of blank 30' or by subsequent grinding thereof. In either case surface 60 is precisely flat and perpendicular to central axis 58 whether the direction of axis 58 is considered to be established prior to the forming of surface 60 or by the forming of said surface. Surface 60 is, and will be referred to hereinafter, as a reference surface relative to which areas 34 and 36 of casting surface 32 are located during generating (grinding) of the casting surface.

Casting surface 32 (FIG. 1) is, of course, formed upon side 32' of glass blank 30 (FIG. 7) and, accordingly, reference surface 60 is blocked to a holder such as, for example, block 64 (FIG. 7) for adapting blank 30' to apparatus used to produce surface 32.

Block 64 is preferably but not necessarily, formed of machined cast iron or steel and has an annular mounting surface 66 (FIG. 7) against which reference surface 60 of the blank is seated. Within the inner confines of annular surface 66, block 64 is recessed to provide cavity 68 into which a removable low melting temperature blocking medium may be injected through port 70 to adherently attach blank 32' to block 64. While pitch or the like may be used as a blocking medium, one of the well-known low melting temperature metallic alloys, also commonly used in lens blocking operations, is preferred. Upstanding locating pin 72 in cavity 68 engages in groove 62 of glass blank 32' thereby assisting to establish and maintain a given orientation of glass blank 30' relative to block 64 during the blocking operation. Tang 73 of block 64 is, in usual fashion, used as means for locating and securing the combination of the block and attached blank to grinding and/or other surface working apparatus.

The use of blocks of various sizes, designs and/or configurations and their function in adapting glass pieces to glass working apparatuses is fundamental in the field of this invention. Accordingly, this aspect of the present process will not be further explained herein. However, it should be understood that the rigid form of block just described may be replaced in this, as in most any other glass grinding operations, by the well-known type of block which, in one operation, is cast of a low melting temperature metallic alloy to its finished shape and adhered to the glass blank in a desired aligned relationship therewith.

The expression "blocking" and various tenses thereof used hereinafter are intended not to restrict the present inventive concept to any one or more of the various techniques or forms of equipment used in the field. Furthermore, all future direct reference to block 64 and the various structural features thereof is to be interpreted as being purely exemplary and inclusive of all equivalencies known to the artisan.

The crux of the present invention lies not specifically with apparatus and/or tools used for blocking, grinding, polishing or otherwise working glass blanks such as 30' but more particularly with the form of glass blank used and especially the system employed for setting up and producing the aforementioned multifocal casting surfaces thereon.

Principles of the present invention

In all multifocal lens work requiring the casting of lenses a mold maker is given the specifications or prescriptive requirements of a particular lens to be produced by his mold. Thus, for a multifocal surface such as 34a of lens L (FIG. 3), for example, the diametral size $a'$ of reading portion 36a, its radius of curvature RP, amount of decentration $b'$ (i.e., from the geometrical center $c$ of the lens) and the radius of curvature DP of distance viewing portion 34a would be given. A typical set of values for a lens such as lens L in FIG. 3 is the following:

$a'=22$ mm.
RP=7.08 diopters (74.86 mm. radius)
$b'=4$ mm.
DP=6.29 diopters (84.26 mm. radius)

Thus, being given the aforesaid information wherein all factors are the same for producing the complementary casting surface 32 (FIG. 1) on side 32' of glass blank 30' (FIG. 7), determination of an exact amount A (FIGS. 2, 7 and 8) to which axis 76 of block 64 need be offset relative to axis 58 of blank 30' for generating surface 36 may be determined as follows:

Depth $z$ is the difference in depth of the curvatures of areas 34 and 36 at a diameter $a$ of area 36. Dimension $y$ is the distance from the center of curvature of area 34 to the vertex of area 36. Dimension $x$ is the desired displacement between the geometric centers of areas 34 and 36 and $y'$ is dimension $y-RP$. From these factors distance A (FIGS. 2, 7 and 8) between axis 58 of blank 30' and axis 76 of block 64 may be determined from the similar triangle relationship wherein:

$$DP/x:y'/A$$

$$A=xy'/DP$$

It should be understood that the aforesaid computations need not be carried out more than once to determine the offset factor A for a particular size, shape and location of lens casting surface to be produced. This and all other subsequent lateral offset factors required in the practice of this invention are normally charted and thereby made readily available for immediate reference. Furthermore, mathematical and geometrical relationships other than those given hereinabove may obviously be employed in determining and/or charting such offset factors.

Figures 7, 8, 9, 10, 11:
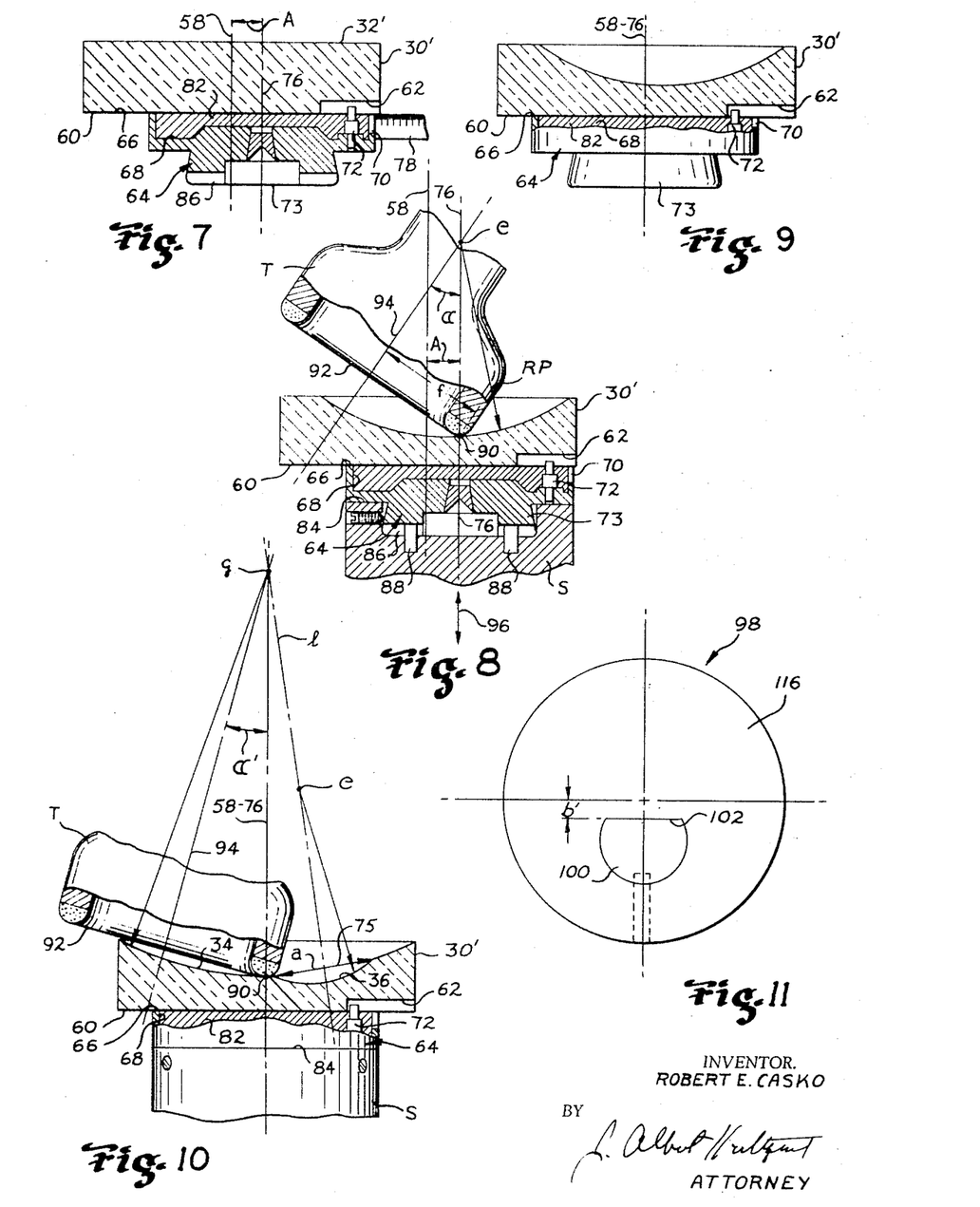
FIGS. 7, 8, 9 and 10 illustrate apparatus and method steps employed to produce the mold piece of FIGS. 1 and 2 according to principles of the invention.
FIG. 11 is a plan view of another mold piece.

According to the above set of typical values of $a'$, RP, $b'$ and DP for lens L, which values correspond to those of casting surface 32 (FIG. 1), distance A in FIGS. 2, 7 and 8 is required to be .062 inch.

Casting surface 32 is formed upon side 32' of glass blank 30' (FIG. 7) as follows:

Glass blank 30' is placed upon block 64 with reference surface 60 firmly seated upon annular mounting surface 66 of block 64.

Blank 30' and block 64 are adjusted laterally one relative to each other along the line of groove 62 to a position where axis 76 of block 64 is displaced the calculated distance A from axis 58 of blank 30'. Axes 58 and 76 are automatically maintained in parallel relationship by reason of reference surface 60 being perpendicular to axis 58 and annular mounting surface 66 being similarly perpendicular to axis 76 of block 64.

The aforesaid adjustment which is linear may be simply accurately measured with as little instrumentation as, for example, a finely graduated scale 78 (FIG. 7) directed along the line of groove 64 and measuring from the adjacent side of block 64 to edge 80 of blank 30'. For greater accuracy of measurement a micrometer, dial indicator or vernier may, of course, be used in place of scale 78. Also, various well-known or specially designed forms of aligning and measuring fixtures may be employed according to the desires of the artisan. The choice of measuring instrumentation has no particular bearing upon the present inventive concept beyond its affect upon the degree of precision involved in performance of this invention and is, accordingly represented by the aforementioned scale 78 (FIG. 7) which should be considered as being purely exemplary.

With block 64 and glass blank 30' disposed in the axially parallel relationship shown in FIG. 7, blocking medium 82 is injected through port 70 to fill cavity 68 therewith and thus attach blank 30' fixedly to block 64.

Referring more particularly to FIG. 8 it can be seen that the radius of curvature RP of surface area 34 is generated, i.e., ground, into side 32' of blank 30' with conventional curve generating apparatus using the type of operation well known in the trade as "end-of-cylinder" generation. The apparatus for generating spherical surfaces in this manner being readily recognized by the artisan is, accordingly, minimally illustrated by a showing of only cupped tool T and machine spindle S which are rotatable about their respective axes.

Block 64 having blank 30' affixed thereto as already mentioned, is clamped coaxially into a receiving end 84 of spindle S. Tang 73 of block 64, having slot 86 receives key members, e.g., pins 88, to prevent rotational slippage of block 64 in spindle S.

In order to generate the spherical curvature of radius RP, i.e. surface area 36, tool T is tilted relative to axis 76 (FIG. 8) to a specified angle $\alpha$ with the centermost point 90 of its effective abrading edge 92 aligned with axis 76. Axis 94 of tool T intersects axis 76 at point $e$ which is the center of curvature of radius RP.

Angle $\alpha$ is determined according to the following well-known relationship used in "end-of-cylinder" generating operations where:

$$\sin \alpha = f/RP$$

when $f$ is equal to the mean radius of the effective abrading edge 92 of tool T.

With spindle S, block 64 and glass blank 30' rotating about axis 76 and tool T rotating about its axis 94 in the aforesaid fixed angulated relationships, side 32' is generated to a spherical curvature of radius RP to form surface 36 by moving tool T, without disturbing its angular setting, and spindle S one toward the other in the direction of axis 76 as indicated by double headed arrow 96.

The depth of cut, not being critical, may be varied according to individual desires. However, it is preferably such that the subsequent step of generating surface area 34 of the mold piece will clear away (i.e., remove) at least the major portion of side 32' of glass blank 30' thereby making casting surface 32 as large as possible. In FIGS. 8 and 9 there is illustrated a typical depth of cut of radius RP for producing a mold piece such as 30 in FIG. 1.

Following generation (grinding) of the curvature of radius RP in FIG. 8, this surface is polished to a fineness of optical perfection. Any of the various recognized forms of optical polishing apparatus (not shown) may be employed for this purpose.

The thus ground and polished glass blank 30' is deblocked by softening and removing blocking medium 82. Next, it is reblocked coaxially with the same or a similar block. For clarity and convenience of illustration, the same block 64 will be shown and described as being used in all subsequent phases of this invention.

The major surface area 34 (FIG. 10) of mold piece 30 is then formed upon glass piece 30' by placing the concentric arrangement of block and blank (FIG. 9) in spindle S (FIG. 10) of the above described generating apparatus whereupon axis 58 becomes that about which blank 30' is rotated.

With point 90 of the effective abrading edge 92 of tool T still located on the axis of spindle S, as it is in FIG. 8 and in all generating operations referred to hereinafter, tool axis 94 now intersects point $g$ (FIG. 10) which is the center of curvature of area 34 to be generated. Accordingly, tool T is set at angle $\alpha'$ so that surface 34 will be generated to a spherical shape.

Angle $\alpha'$ is determined according to the same relationship used to determine angle $\alpha$ hereinabove by merely substituting the value of radius DP for that of RP, i.e., $\sin \alpha' = f/DP$.

Again, as before, rotation of tool T about its axis and spindle S about its axis will generate a spherical surface into glass blank 30'. This time, however, the spherical surface is surface area 34. The depth to which it is generated (ground) by movement of tool T and spindle S one toward the other in the direction of axis 58, is controlled according to the diametral dimension as desired of area 36.

To complete mold piece 30, surface 34 is optically polished.

It can be seen in FIGS. 2 and 10 that, according to principles to this invention, centers of curvature $e$ and $g$ are each located on line $l$ extending through the center of surface area 36 in a direction perpendicular to chord 75 thereof. This being accomplished simply, efficiently and with exceptional precision by a systemized technique of locating these centers ($e$ and $g$) through controlled lateral displacement of the mold piece being worked upon, the advantages of which have been discussed hereinabove.

Also, according to principles of this invention, it should be noted that line $l$ extends through the centers of longest and shortest radii of curvature $g$ and $e$ respectively of all multifocal surface areas produced upon the mold piece. While, in the present instance of mold piece 30 there are only two such surfaces (34 and 36) it will become apparent hereinafter that with but one exception mold pieces requiring intermediate focal field casting areas will have centers of curvature of their intermediate areas also located on a line such as line $l$. The aforesaid "one exception" relates to the type of mold piece depicted in FIG. 24 which will be subsequently discussed in detail.

A modification of mold piece 30 is depicted in FIG. 11. Mold piece 98 in FIG. 11 differs from mold piece 30 (FIG. 1) only in that its minor casting surface area 100 has an upper straight cliff edge 102.

Mold piece 98 (FIG. 11) is formed as follows:

Glass blank 104 (FIG. 12) initially similar in all respects to blank 30' of FIGS. 7–10 is provided with curved surface 106 of the radius of curvature desired of casting surface area 100 (FIG. 11). To produce surface 106, the steps used with reference to FIGS. 7 and 8 to form glass blank 30' to the stage illustrated in FIGS. 8 and 9 are carried out with glass blank 104.

Figures 12, 13, 14, 15, 16, 17:
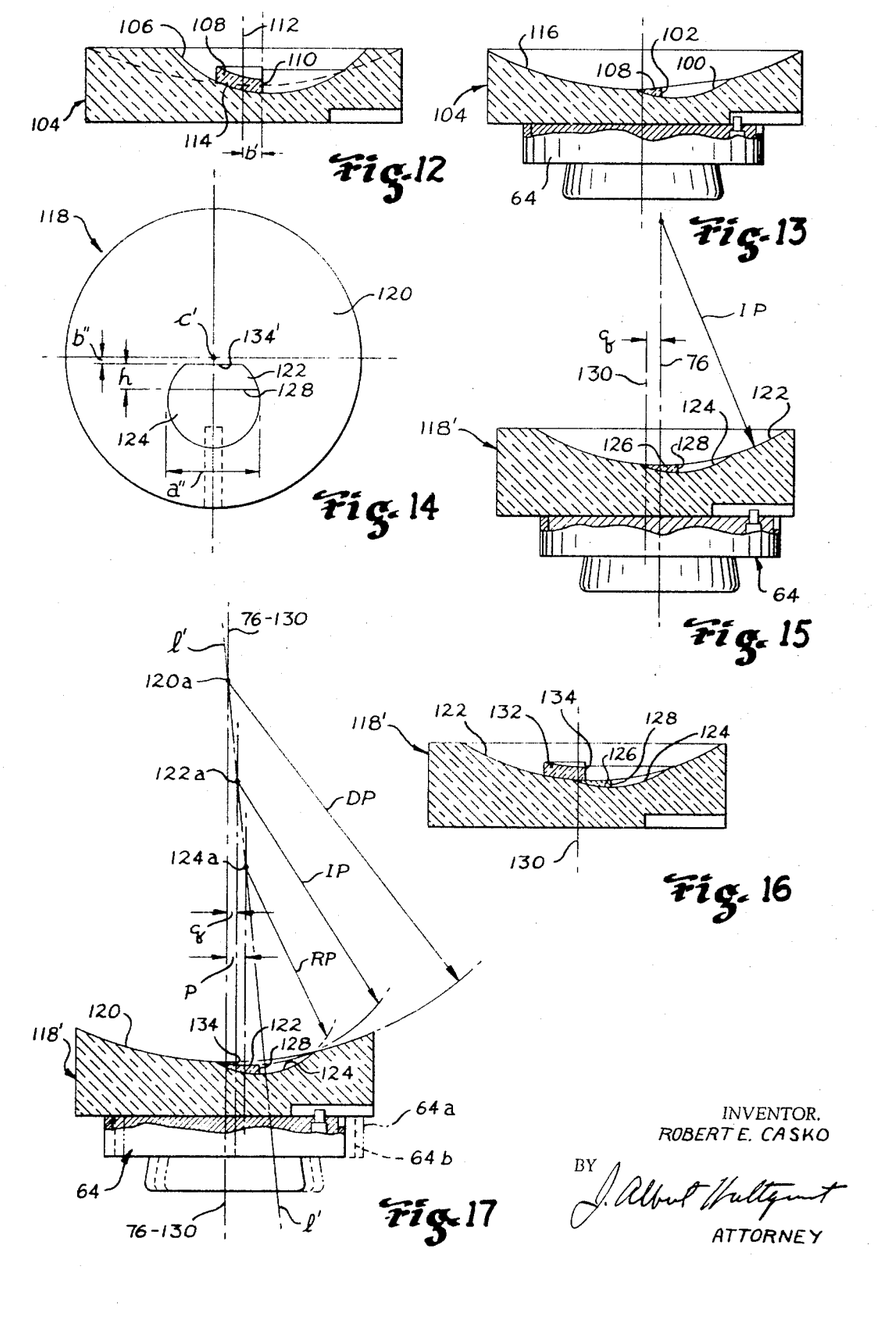
FIGS. 12 and 13 illustrate apparatus and method steps used to produce the mold piece of FIG. 11.
FIG. 14 is a plan view of still another mold piece.
FIGS. 15, 16 and 17 illustrate apparatus and method steps used to produce the mold piece of FIG. 14.

Thereupon, glass segment 108 having straight edge 110 is placed upon surface 106 with edge 110 carefully located at a prescribed or desired offset distance $b'$ from axis 112 of blank 104. Side 114 of segment 108 is preformed to a curvature matching that of surface 106.

The glass of segment 108 is so preselected as to have a lower melting temperature than that of blank 104 and an expansion coefficient compatible for effecting its fusion to blank 104. In a manner long familiar to those working in the lens art, segment 108 is fused to blank 104.

Fusion per se of one glass piece to another forms no part of the present invention and, accordingly, the procedure followed to effect the same will not be discussed at this point or in subsequent references to this type of operation. Prior art dealings with the fusing of segments or pieces of glass to other glass pieces or blanks in lens work is voluminous and has long before established the basic principles involved with respect to which no artisan would be unfamiliar.

Once segment 108 is fused in place, blank 104 is blocked concentrically upon block 64 and the major casting surface area 116 of mold piece 98 is formed by following precisely the procedure used to form area 34 of blank 30' (see FIG. 10). In FIG. 13 it can be seen that when surface 116 is formed, the remaining portion of surface 106 provides minor casting surface area 100. What is left of segment 108 blends with surface 116 and straight edge 110 produces the aforementioned cliff edge 102.

FIGS. 14, 15, 16 and 17 concern the manufacture of a mold piece 118 for use in the casting of trifocal plastic lenses.

Mold piece 118 has major casting surface area 120, intermediate area 122 and area 124 for forming the distance, intermediate and reading fields respectively of trifocal lenses to be cast thereupon.

Typical of radii of curvature and other dimensions of a mold piece of this type are the following:

| | |
|---|---|
| DP curvature (major casting surface 120) (84.261 mm. radius) __________________diopters__ | 6.29 |
| IP curvature (intermediate casting surface 122) (72.207 mm. radius) _____________diopters__ | 7.34 |
| RP curvature (reading casting surface 124) (63.246 mm. radius) ____________________diopters__ | 8.38 |
| Diameter of surface 124 (dimension $a''$) __mm__ | 22 |
| Height $h$ of surface 122 ___________________mm__ | 6 |
| Distance $b''$ below center $c'$ of mold piece __mm__ | 1.5 |

Mold piece 118 is formed of glass blank 118' into which are generated (ground and polished) surfaces 122 and 124 (FIG. 14) having glass segment 126 fused therein to form cliff edge 128 of area 122.

The procedure used to form blank 118' to this stage (i.e., that shown in FIG. 14) is the same as is used to form mold piece 98 (see FIG. 13 and the related description hereinabove). Here, however, surface 122 (FIG. 17) is formed to the radius of curvature IP of intermediate casting surface 122. Accordingly, axis 130 of blank 118' is offset the distance $q$ from axis 76 of block 64 rather than being concentric therewith since surface 120 of a longer radius of curvature is yet to be applied.

In order to satisfy the requirements of the exemplary dimensions which are set forth hereinabove for a typical mold piece 118, distance $q$ would be .057 inch.

Having formed blank 118' to the extent or stage of partial completion shown in FIG. 14, it is removed from block 64 and a second glass segment 132 is fused to surface 122 partially over segment 126. Straight edge 134 of segment 132 is disposed parallel to and spaced from edge 128 of segment 126 a distance equal to $h$ in FIG. 14. Edge 134 thus, ultimately, forms the cliff or shoulder 134' between area 120 and area 122 (FIG. 14).

Blank 118' with fused segment 132 is then blocked concentrically upon block 64 (FIG. 17) whereupon surface 120 is generated (ground and polished) to the curvature of DP radius.

In FIG. 17 there is illustrated the three stages of lateral offset blocking used to form mold piece 118.

In generating and polishing surface 124, block 64 is located in the position represented by dot-dash outline 64$a$; in generating and polishing surface 124, block 64 is located in the position represented by dot-dash outline 64$b$; and in generating and polishing surface 120, block 64 is positioned as shown in the full line illustration thereof.

Thus, to achieve such blocking according to principles of this invention, i.e., so that the centers of curvature 124$a$, 122$a$ and 120$a$ of surfaces 124, 122 and 124, respectively, are placed along a line extending perpendicular to a tangent of the center or apex (optical center) of the area of smallest radius of curvature (line $l'$ in FIG. 17), axis 130 of blank 118' is laterally offset the distances $p$, $q$ and zero (coaxial) from axis 76 of block 64 with each blocking operation performed in that order.

For producing mold piece 118 having the above-given exemplary radii of RP, IP and DP curvature, distances $p$ and $q$ would be .099 and .057 of an inch respectively. These distances, of course, may be determined by following the procedure outlined hereinabove concerning determination of distance A in FIG. 2.

Figures 18, 19, 20:
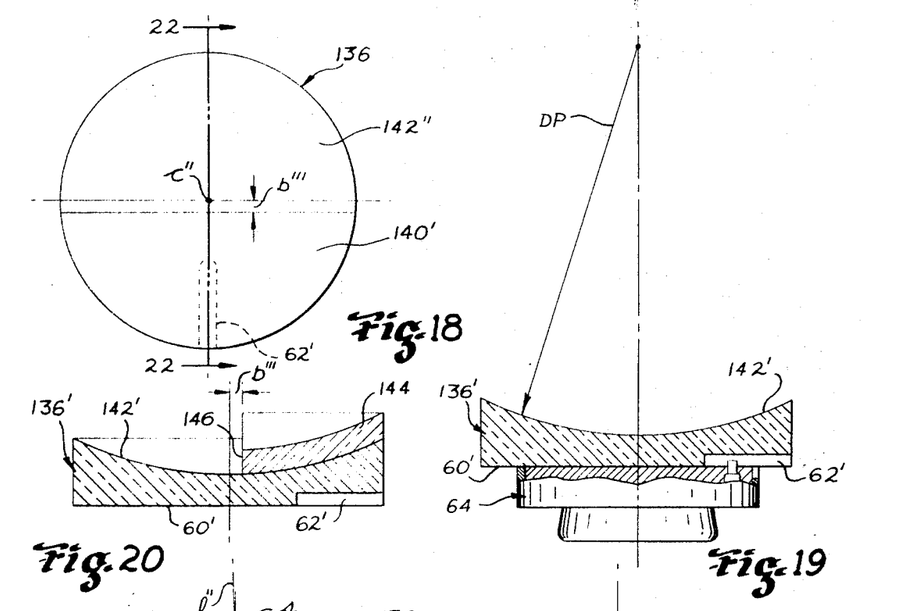
FIG. 18 is a plan view of an additional mold piece.
FIGS. 19, 20, 21 and 22 illustrate apparatus and method steps used to produce the mold piece of FIG. 18.

In FIG. 18 there is illustrated mold piece 136 used to cast bifocal lenses of the type well known in the art as Franklin bifocals in that they have a straight cliff-like line of division extending completely thereacross between reading and distance viewing fields much like the original bifocal lenses invented by Benjamin Franklin.

A plastic lens of the type capable of being cast by mold piece 136 is depicted in cross-section (FIG. 23) to show the aforementoned cliff-like line of division 138, reading field 140 and distance field 142.

Mold piece 136 is formed of glass blank 136' (FIG. 19) which, is first mounted concentrically with block 64 and a spherical surface 142' is generated thereon. Surface 142' is formed to a radius of curvature DP equal to that desired of distance viewing casting area 142'' of mold piece 136 (FIG. 18).

Surface 142' is optically polished and blank 136' is removed from block 64 whereupon glass segment 144 having straight edge 146 is fused to surface 142'. Segment 144 is positioned with its edge 146 extended perpendicularly to radial groove 62' in surface 60' of blank 136' at a prescribed or desired distance $b'''$ from center $c''$ of mold piece 136'. The functions of flat surface 60' and groove 62' are the same as are those for corresponding items of all embodiments of this invention (i.e., as described with relation to surface 60 and groove 62 of mold piece 30' in FIGS. 7–9).

A filler piece of glass 148 is removably adhesively secured to surface 142' of blank 136' (see FIG. 21) to prevent uneven grinding of fused glass segment 144 during subsequent generation of a surface curvature RP thereon. The use of removable glass filler pieces is common in many lens grinding operations and the need or desirability of their use has long been recognized. Glass pieces 148 forms no part of the final structure of mold pieces 136, it is removed after the grinding and polishing of fused glass segment 144.

Fused glass segment 144 is ground to the curvature RP desired of casting surface area 140' of mold piece 136 (FIG. 18) which is intended to form reading field 140 of a lens (FIG. 23) to be cast thereupon. This is accomplished by blocking blank 136' with its axis 150 in laterally offset relationship a distance $r$ from axis 76 of block 64 in the direction of groove 62'. This places the centers of curvatures $s$ and $u$ both on line $l''$.

Figures 21, 22, 23:
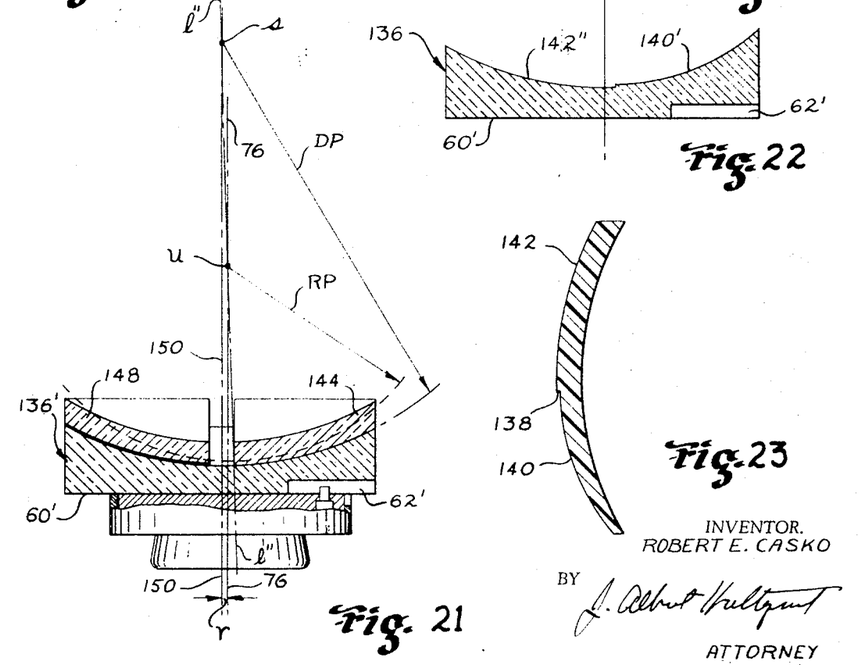
FIG. 23 is a cross-sectional view of a cast plastic lens illustrating the surface configuration capable of being produced by the casting surface of the mold piece of FIG. 18.

Upon generation (grinding) and polishing of the surface curvature of radius RP (FIG. 21) on glass segment 144 and removal of filler piece 148 mold piece 136 having the cross-sectional configuration depicted in FIG. 22 results.

Typical of one set of values actually used for radii of curvatures DP and RP of casting surface areas 142'', 140' respectively and distance $r$ (FIG. 21) are:

DP=6.29 diopters (84.261 mm. radius)
RP=8.38 diopters (63.246 mm. radius)
$r$=.029 of an inch The latter class or type of multifocal lenses also includes the trifocal which is cast with a mold piece having casting surface areas corresponding in spherical curvature to those desired of distance viewing, intermediate and reading fields thereof.

Figures 24, 25, 26:
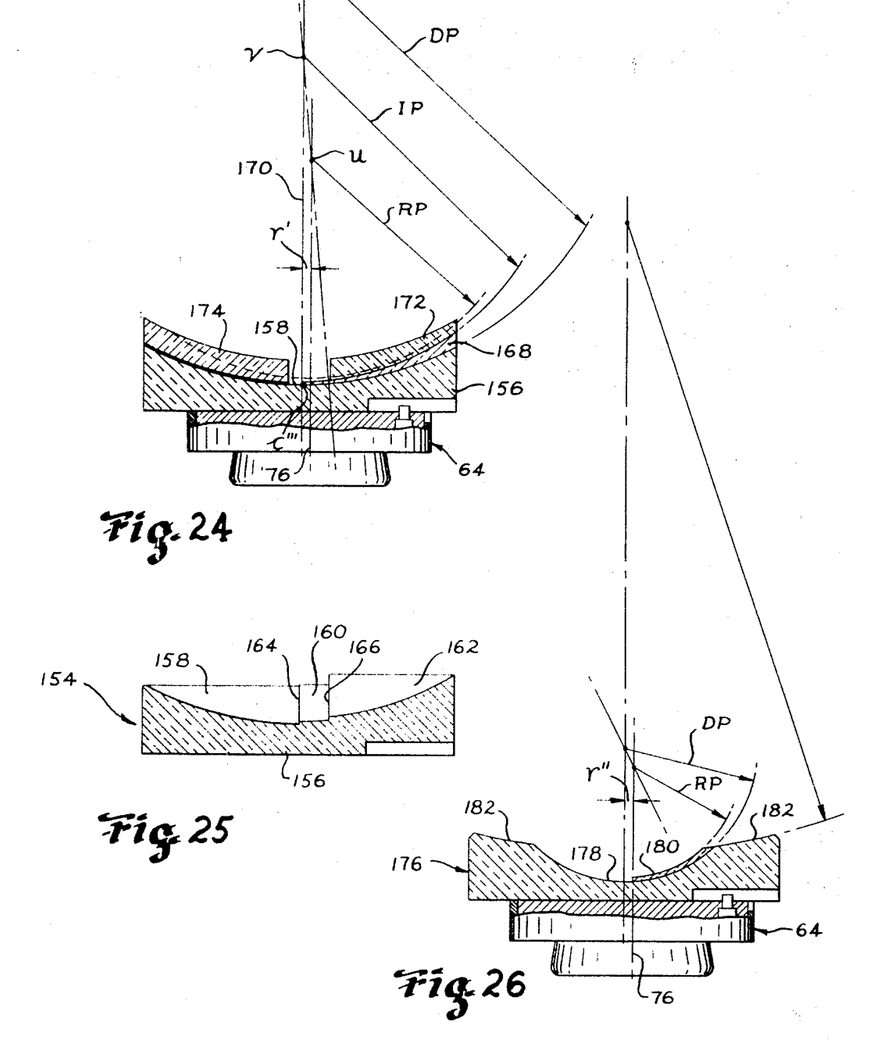
FIG. 24 illustrates apparatus and procedure used to produce yet another form of mold piece.
FIG. 25 is a cross-sectional view of the mold piece produced according to the procedure illustrated in FIG. 24; and lastly
FIG. 26 illustrates a modification of the mold piece of FIG. 18 and apparatus and method for making the same.

Such a mold piece 154 formed according to principles of this invention is illustrated in FIG. 25. It comprises glass blank 156 having casting surface areas 158, 160 and 162 separated from one another by cliff-like lines of division or edges 164 and 166.

Mold piece 156 is formed by generating on blank 156 a curved surface of a radius DP desired of area 158 (see FIG. 24), optically polishing this surface and fusing glass segment 168 thereon which is ground and polished to a radius of curvature IP.

To this point blank 156 is similar to mold piece 136 (FIG. 18) with the exception of segment 168 extending from center $c'''$ of blank 156 rather than being spaced therefrom as is segment 144 in mold piece 136. Additionally, both the DP and IP have their centers of curvature $s'$ and $v$ respectively located on axis 170 of blank 156. That is, in generating and polishing each of casting surface areas 158 and 160, blank 156 is positioned concentrically on block 64.

Typical of a set of values actually used for radii of curvatures DP, IP and RP and distance r' (FIG. 24) of mold piece 154 are:

DP=6.29 diopters (84.261 mm. radius)
IP=7.34 diopters (72.207 mm. radius)
RP=8.38 diopters (63.246 mm. radius)
r=.039 of an inch Casting surface area 162, however, which is formed by fusing an additional glass segment 172 over segment 168 is generated in segment 172 with axis 170 of blank 156 laterally offset distance r' from axis 76 of block 64.

Removable glass filler piece 174 is used to prevent uneven grinding and polishing of segment 172 during the forming of surface 162 thereon whereafter piece 174 is removed from surface 158.

FIG. 26 illustrates an additional embodiment of the invention wherein mold piece 176 has casting surface areas 178 and 180 generally similar to surfaces 142' and 140' of mold piece 136 (FIG. 22). Surface areas 178 and 180 being of stronger or shorter radii of curvature may, nevertheless, be formed according to the procedure outlined above with respect to FIGS. 18–23.

Being intended for use in casting multifocal (bifocal) aphakic lenses, mold piece 176 is provided with an annular casting surface area 182 formed concentrically with area 178 upon which the usual and well-known outer rim portion commonly referred to as the lenticulation of such lenses is cast.

It will be noted in FIG. 26 that mold piece 176 is laterally offset on block 64 a distance r''. This setting is used to generate surface area 180.

Typical of a set of values actually used for radii of curvatures DP and RP and distance r'' for a mold piece such as 176 are:

DP=16.82 diopters (31.510 mm. radius)
RP=19.47 diopters (27.221 mm. radius)
r''=.013 inch From the foregoing, it can be seen that a method is provided wherewith glass mold pieces required to fulfill the prescriptive and/or design requirements for most, if not all, ophthalmic and other cast plastic multifocal lenses encountered in the field may be produced simply and with exceptional precision and efficiency. This is attributable to the present introduction of a novel system for producing different offset focal field casting areas on the mold pieces with a lateral, linearly measured, offset blocking procedure which avoids the oppressive prior art requirement for a high degree of technical knowledge and skill in the performance of time consuming blocking and grinding procedures involving angulation of mold piece blanks.

I claim:

1. The method of making a mold piece of glass for use in casting plastic lenses of the type each having on one of their sides a number of adjoining focal fields of different radii of spherical surface curvature, at least one of which is disposed in laterally offset relationship to another;

said method comprising the steps of:
producing a flat reference surface on one side of a cylindrical glass blank which is to have formed upon its opposite side a multifocal lens casting surface having different casting areas corresponding in number, radii of spherical curvature and positional relationship to said focal fields of said lenses, said reference surface being disposed perpendicularly to the axis of the cylindrical blank;
in a first stage of said method, affixing said flat reference surface of said glass blank to a flat mounting surface of a first block with said blank being laterally displaced on said block a predetermined linearly measured distance from the axis of the block to the axis of said blank, said distance being equal to the extent of offset required of one of said casting areas relative to another, the axis of said blank being parallel to said block axis;
rotating said block about its axis;
generating into said opposite side of said blank said one of said casting areas with the center of spherical curvature of said one area located on said axis of said block;
removing said blank from said block; and
in a second stage of said method, affixing to said flat reference surface a second block disposed in coaxially aligned relationship with said blank;
rotating said second block about its axis;
generating into said opposite side of said blank said other of said casting areas with its center of curvature located on the common axis of said blank and second block;
removing said blank from said second block; and
polishing each of said casting areas to a degree of optical perfection.

2. The method as recited in claim 1 wherein said one focal field of said lenses has a straight cliff-like edge along a side thereof and prior to said second stage, the method further comprises the steps of:
placing a segment of glass having a straight edge upon said one casting area, the glass of said segment having a coefficient of expansion and melting temperature compatible for fusion to said casting area, applying heat to said segment and casting area of an intensity and for a period of time sufficient to fuse said segment to said casting area, annealing the fused assembly and returning the resulting glass blank to approximately its normal temperature whereby said subsequent generating of said other of said casting areas blends said segment of glass into the curvature of said other casting area leaving a portion of said straight edge across said one casting area to form said cliff-like edge upon lenses cast in the mold piece.

3. The method as recited in claim 2 wherein said one casting area is of shorter radius of curvature than said other casting area and the steps of said first stage of said method precede those of said second stage.

4. The method as recited in claim 2 wherein said one casting area is of longer radius of curvature than said other casting area and the steps of said first stage of said method succeed those of said second stage thereof.

5. The method as recited in claim 2 wherein said one casting area is of shorter radius of curvature than said other casting area, the former constituting a reading field casting area and the latter a distance field casting area for use in producing reading and distance focal fields respectively of said plastic lenses.

6. The method as recited in claim 5 including a third stage comprising the steps of:
affixing said flat reference surface of said blank to a flat mounting surface of a third block with said blank displaced on said block a predetermined linearly measured distance from the axis of the block to the axis of the blank, said distance being equal to the extent of offset required of a focal field casting area to be formed intermediately of said reading and distance focal field casting areas;
rotating said block about its axis;
generating into said opposite side of said blank said intermediate focal field casting area with its center of spherical curvature located on said axis of said third block; and
removing said blank from said third block.

7. The method as recited in claim 6 wherein the steps of said third stage of the method are performed intermediately of the steps of said first and second stages whereby said intermediate focal field casting area is generated into said fused segment of glass by performance of the steps of said second stage of the method.

8. The method as recited in claim 7 wherein a second segment of glass having a straight edge and coefficient of expansion and melting temperature compatible for fusion to said first segment is fused to said first segment of glass with heat applied to said blank and thereafter returned to approximately its normal temperature prior to the performance of the steps of said second stage of the method whereby said edge of said second segment of glass forms a cliff-like edge across said intermediate casting area.

9. The method as recited in claim 8 wherein said second, third and first stages of said method are performed in that order.

10. The method as recited in claim 9 wherein said second and third stages of said method are performed with said second and third blocks affixed to said flat reference surface of said glass blank in coaxial relationship with said blank in each instance and said first stage of said method is performed with said first block affixed to said flat reference surface of said glass blank with its axis in spaced parallel relationship with the axis of said glass blank.

References Cited

UNITED STATES PATENTS

| | | | |
|---|---|---|---|
| 1,538,812 | 5/1925 | Hill | 65—37 |
| 3,297,422 | 1/1967 | Emerson et al. | 65—54 |

S. LEON BASHORE, Primary Examiner

E. R. FREEDMAN, Assistant Examiner

U.S. Cl. X.R.

18—39; 51—216, 217, 284; 65—54, 61, 38, 106, 374; 264—1